Jan. 9, 1951 W. O. CRITCHFIELD ET AL 2,537,653
MILLROLL SPINDLE
Filed July 11, 1947 2 Sheets-Sheet 1
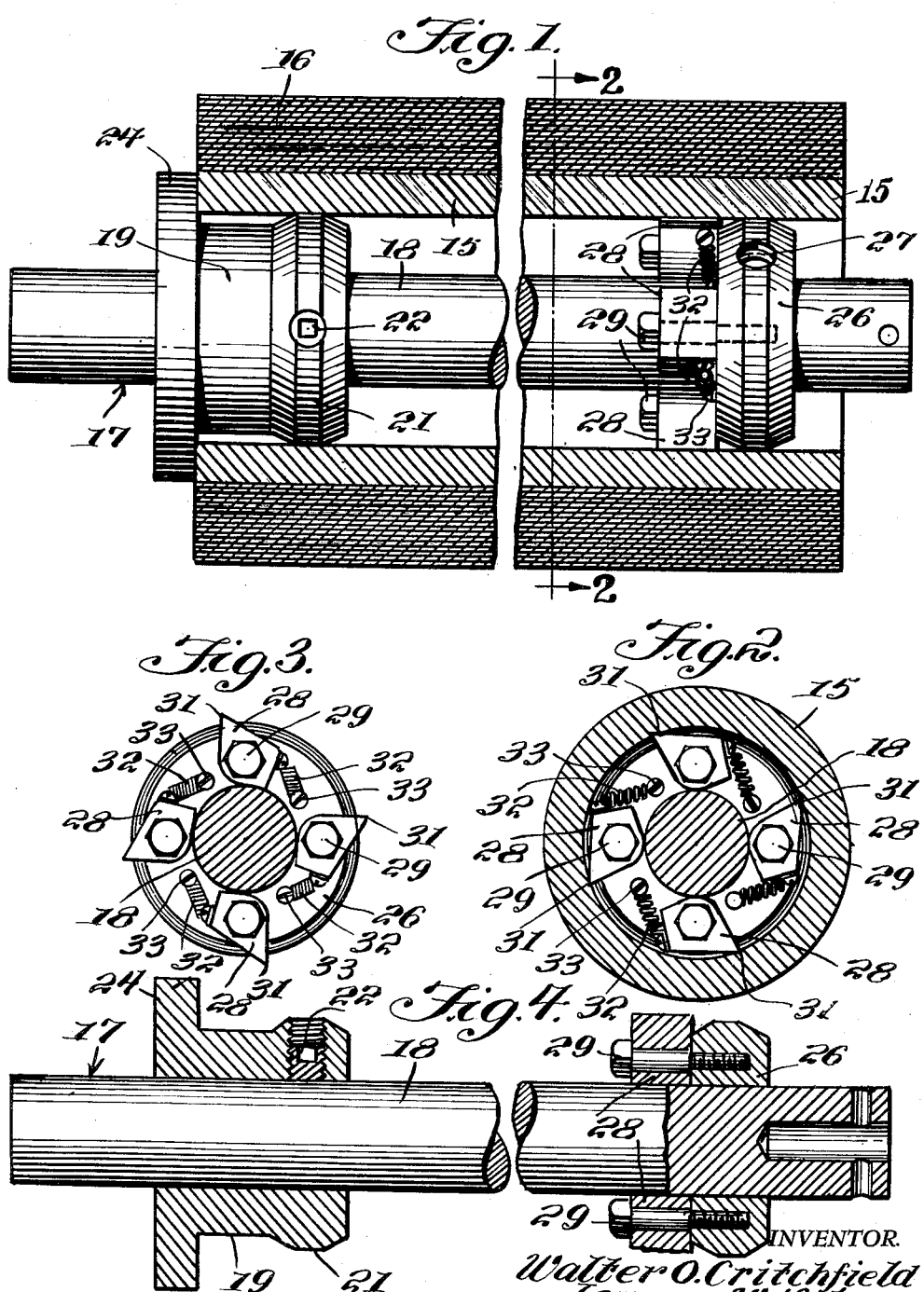
INVENTOR.
Walter O. Critchfield
James W. Kehoe
BY Victor J. Evans & Co.
ATTORNEYS Jan. 9, 1951  W. O. CRITCHFIELD ET AL  2,537,653
MILLROLL SPINDLE
Filed July 11, 1947  2 Sheets-Sheet 2
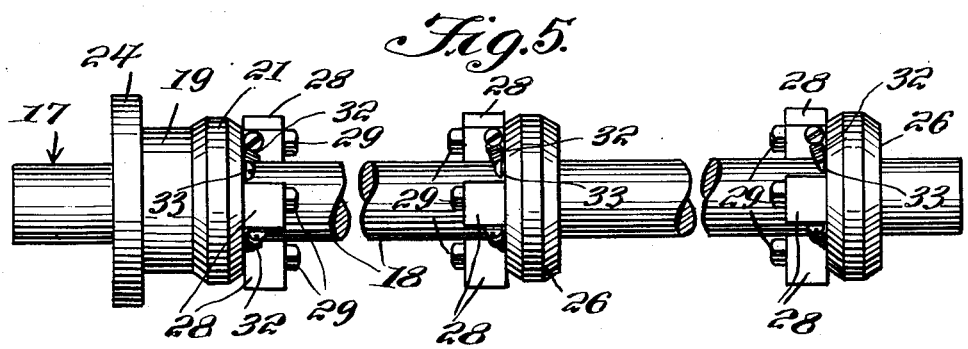
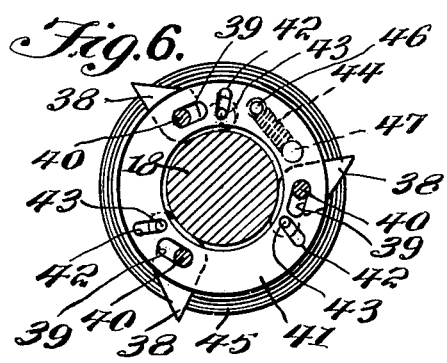
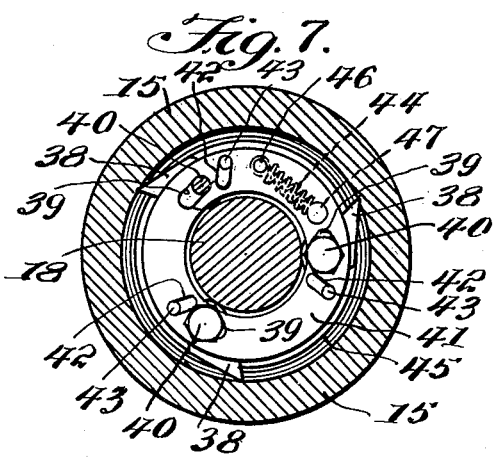
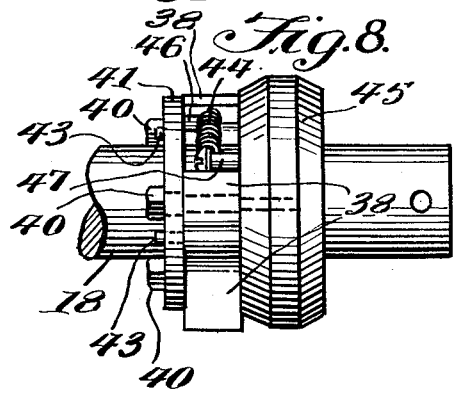
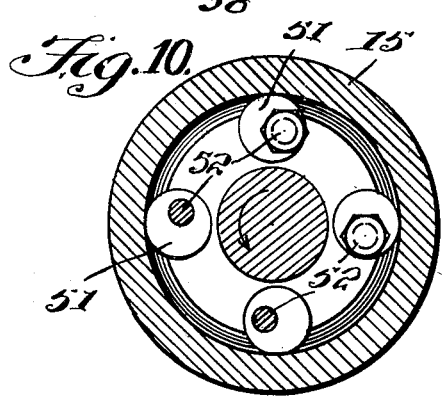
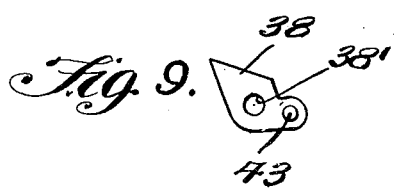
INVENTOR.
Walter O. Critchfield,
James W. Kehoe
BY Victor J. Evans & Co.
ATTORNEYS Patented Jan. 9, 1951

2,537,653

UNITED STATES PATENT OFFICE 2,537,653

MILL ROLL SPINDLE

Walter O. Critchfield and James W. Kehoe, Shelby, Ohio, assignors to The Shelby Salesbook Company, Shelby, Ohio, a corporation of Ohio Application July 11, 1947, Serial No. 760,280

3 Claims. (Cl. 242—72)

This invention relates to millroll spindles.

It is an object of the present invention to provide a millroll spindle which can be easily and readily inserted into a core of a millroll and which can be easily removed from the same after the mill roll has been used and wherein the millroll spindle is so constructed that the millroll will be installed upon the spindle at the same location or position as the previously removed millroll whereby adjustment of the spindle upon the mill frame becomes unnecessary when the new millroll has been attached.

It is another object of the present invention to provide a centering means in a millroll spindle whereby the millroll will be centered radially thereupon and whereby smoother and balanced operation, as the millroll spindle turns in its bearings, is permitted and whereby a better cutoff register can be had with the millroll and wherein more paper will be permitted to be run off the millroll core.

Other objects of the present invention are to provide a millroll spindle which is of simple construction, inexpensive to manufacture and efficient in operation.

For other objects and for a better understanding of the invention, reference may be had to the following detailed description taken in connection with the accompanying drawing, in which Fig. 1 is a longitudinal cross-sectional view taken through the millroll core but of the millroll spindle shown in full and in side elevation.

Fig. 2 is a transverse cross-sectional view taken on line 2—2 of Fig. 1 with the millroll core removed.

Fig. 3 is a similar cross-sectional view taken on the same line but with the spindle removed from the core and the engaging dogs extended.

Fig. 4 is a fragmentary and cross-sectional view of the spindle with certain of the parts thereof shown in section.

Fig. 5 is an elevational view looking upon a millroll spindle in which dog engaging arrangements are provided at both ends of the spindle shaft and intermediate thereof.

Fig. 6 is a cross-sectional view taken through a spindle shaft and looking upon a modified form of dog arrangement.

Fig. 7 is a cross-sectional view taken through the spindle shaft and a millroll core with the dog arrangement shown in Fig. 6 engaging with the inner surface of the millroll core.

Fig. 8 is a side elevational view of the dog arrangement shown in Figs. 6 and 7.

Fig. 9 is a detail side elevational view of one of the dogs used with the form of the invention shown in Figs. 6 to 8.

Fig. 10 is a cross-sectional view showing a still further form of the dog engaging arrangement wherein the dogs are eccentrically arranged.

Referring now to Figs. 1 to 4 in particular, 15 represents a millroll core on which there is wound paper or other material indicated at 16. This millroll must be supported in order that the paper or other material can be unwound from the same. For supporting this millroll core within a mill, there is provided a millroll spindle indicated generally at 17 and embodying the features of the present invention. This spindle includes a shaft or rod 18 to which there is fixed at one end a collar 19 having an enlargement portion 21 at one end of the same and through which set screws 22 are extended to fix the collar to the rod 18. The set screw at 18 will be lowered to the bottom of its hole 23 so as not to interfere with the mounting of the millroll core 15 thereupon. When the core 15 is placed on the spindle, it will be slid over the raised portion 21 of the collar 19 and will abut a flange 24.

On the opposite end of the rod 18 is a collar 26 which is similarly connected to the rod by a set screw seated in opening 27. On this collar there are mounted a plurality of dogs 28 for pivotal movement on bolts 29. These dogs are pointed as indicated at 31 and will mesh with the interior surface of the core 15 whereby to provide a driving engagement therewith. These dogs respectively have connected to them springs 32 anchored to the face of the collar 26 by a screw 33. The dogs will prohibit relative rotation of the core in one direction with respect to the spindle but will permit the rotation of the core on the spindle in the opposite direction.

To insert the spindle into the millroll core, the spindle is pushed in and at the same time an anti-clockwise twist is applied to the spindle. To remove the spindle it is pulled and at the same time a clockwise twist is applied.

As viewed in Fig. 5, it will be apparent that the dogs can also be disposed on collar 19 and particularly on the raised portion 21 thereof. This will provide engagement of the core with the collar end of the spindle and at the end thereof having the side registery flange.

Referring now to Figs. 6 to 9, a modified form of dog 38 is used. This dog has a hole 38' through which pin 40 extends. Outside the dog 38 is a ring 41 having circumferentially spaced elongated slots 39 and radially extending slots 42 through which extends respectively pins 43 from the dogs. The ring is connected by a spring 44 to the collar 45. The anchor posts for the spring upon the ring and upon the collar are shown respectively at 46 and 47 in Fig. 8. The spring through the ring tends to urge the dogs to their extended position and into engagement with the core as viewed in Fig. 7.

In Fig. 10, there is shown a still further form of the invention. Dogs are in the form of discs 51 eccentrically pivoted upon bolts or pins 52 connected to the front face of the collar. These discs will grip the interior of the core 15 when the spindle is rotated in one direction but will release when the spindle is rotated in the opposite direction.

While various changes may be made in the detail construction, it shall be understood that such changes shall be within the spirit and scope of the present invention as defined by the appended claims.

We claim:

1. In a releasable millroll clutch, the combination which comprises a spindle having a plurality of spaced collars thereon for receiving a millroll having a core with the said core of the millroll positioned on the said collars, a plurality of spaced gripping dogs positioned on a face of one of said collars, means pivotally mounting the said dogs on the collar with gripping parts of the dogs eccentrically positioned whereby with the spindle rotated in one direction the dogs bite into the inner surface of the core of the spindle and with the spindle rotated in the opposite direction the dogs release the core from the spindle, and resilient means connected to the dogs and collar for urging the gripping parts of the dogs into gripping relation with the core.

2. In a releasable millroll clutch, the combination which comprises a spindle having a plurality of spaced collars thereon for receiving a millroll having a core with the said core of the millroll positioned on the said collars, a plurality of spaced gripping dogs positioned on a face of one of said collars, a flange carried by the spindle and positioned to engage the ends of the collar to limit movement of the millroll on the collars, means pivotally mounting the said dogs on the collar with gripping parts of the dogs eccentrically positioned whereby with the spindle rotated in one direction the dogs bite into the inner surface of the core of the spindle and with the spindle rotated in the opposite direction the dogs release the core from the spindle, and resilient means connected to the dogs and collar for urging the gripping parts of the dogs into gripping relation with the core.

3. In a releasable millroll clutch, the combination which comprises a spindle having a plurality of spaced collars thereon for receiving a millroll having a core with the said core of the millroll positioned on the said collars, a plurality of spaced gripping dogs positioned on a face of one of said collars, a flange carried by the spindle and positioned to engage the ends of the collar to limit movement of the millroll on the collars, pins pivotally mounting the said dogs on the collar with gripping parts of the dogs eccentrically positioned whereby with the spindle rotated in one direction the dogs bite into the inner surface of the core of the spindle and with the spindle rotated in the opposite direction the dogs release the core from the spindle, a floating ring carried by the said pins and having slotted openings through which the said pins extend, said ring also having slotted openings therein in which actuating pins of the dogs are positioned, and resilient means connected to the ring and collar for urging the gripping parts of the dogs into gripping relation with the core of the millroll.

WALTER O. CRITCHFIELD.
JAMES W. KEHOE.

REFERENCES CITED

The following references are of record in the file of this patent:

UNITED STATES PATENTS

| Number | Name | Date |
|---|---|---|
| 799,912 | Masterson | Sept. 19, 1905 |
| 2,171,300 | Mann | Sept. 5, 1939 |
| 2,311,383 | Hardenberg | Feb. 16, 1943 |

FOREIGN PATENTS

| Number | Country | Date |
|---|---|---|
| 252,547 | Italy | Mar. 24, 1927 |